United States Patent [19]

Mueller

[11] 4,445,373
[45] May 1, 1984

[54] BALANCING MACHINE AND SUPPORT STRUCTURES USABLE THEREWITH FOR MEASURING UNBALANCE IN A ROTOR

[75] Inventor: Richard Mueller, Lynchburg, Va.

[73] Assignee: American Hofmann Corporation, Lynchburg, Va.

[21] Appl. No.: 422,285

[22] Filed: Sep. 23, 1982

[51] Int. Cl.³ .............................................. G01M 1/02
[52] U.S. Cl. ........................................ 73/473; 73/477
[58] Field of Search .......................... 73/460, 462–466, 73/471–473, 475–477, 66

[56] References Cited

U.S. PATENT DOCUMENTS

| | | | |
|---|---|---|---|
| 2,722,465 | 11/1955 | Ellis | 73/66 |
| 3,159,435 | 12/1964 | Schlick | 308/26 |
| 3,182,511 | 5/1965 | Federn et al. | 73/477 |
| 4,162,633 | 7/1979 | Muller | 73/462 |

FOREIGN PATENT DOCUMENTS

| | | | |
|---|---|---|---|
| 118262 | 6/1944 | Australia | 73/66 |
| 2037445 | 9/1980 | United Kingdom | 73/471 |

Primary Examiner—James J. Gill
Attorney, Agent, or Firm—Fleit, Jacobson, Cohn & Price

[57] ABSTRACT

A balancing machine and support structure usable therewith for measuring unbalance in a rotor. Each support structure of the balancing machine has a pedestal, a yoke, and springs interconnecting the yoke and pedestal. A pair of round springs are positioned between confronting surfaces of the yoke and pedestal. A pair of flat springs are connected to one of the yoke pedestal and are selectively engagable with the other of the yoke and pedestal. A connecting plate is provided to interconnect the yokes of two structures to each other when the flat springs are disengaged. The connecting plate is removed when the flat springs are engaged. As a result, the balancing machine can be used in a first configuration to measure unbalance in a rotor having a bearing prepositioned on a shaft of the rotor and can be used in a second configuration to measure unbalance in a conventional rotor not having a bearing prepositioned on a shaft.

4 Claims, 3 Drawing Figures

BALANCING MACHINE AND SUPPORT STRUCTURES USABLE THEREWITH FOR MEASURING UNBALANCE IN A ROTOR

BACKGROUND OF THE INVENTION

1. Field of the Invention

The present invention relates to balancing machines and support structures usable with balancing machines. More particularly, the invention provides a balancing machine that has support structures with upper portions interconnected with each other during a first type of balancing operation, the upper portions being movable with respect to each other during a second type of balancing operation.

2. Description of the Prior Art

Due to production flow requirements or quality assurance of electric motors for hand tools or appliances, it often is necessary to balance rotors for these motors using their own ball or sleeve bearings located between commutator and fan. For convenience of assembly, non-rotating parts are put on the rotor prior to balancing. These loose-hanging parts, usually behind the bearing on the armature, have to be held in place while balancing, without influencing the balancing measurements.

In the past, balancing of such rotors required use of flexible spring-loaded saddle bearings, as described in U.S. Pat. No. 3,159,435, or bearing-loaded bearings, as described in U.K. 2,037,445, such bearings being positioned on top of work supports. In such saddle bearings, cradles have been used to connect saddles with each other or two-plane measuring tables supported by three of more round springs, with two built-in force measuring pick ups in each end, have been used. One type of the first mentioned kind of balancer uses two rigid load cells, such as piezo crystal force transducers, or semi-rigid work supports with displacement or velocity type pick ups or transducers to measure remaining vibrations, as described in U.S. Pat. No. 3,182,511.

In flexible or self-aligning saddle bearings, cradles are usually used to connect these saddle bearings with each other to accommodate the rotors in their own bearings. Supports of the type described in U.S. Pat. No. 3,159,159 and U.K. 2,037,445 have been used to compensate for a bend in the rotor shaft (axis of shaft skewed to axis of rotor) or lack of perpendicularity between bearings attached to the shaft and the shaft axis. One disadvantage of spring-loaded saddle bearings of the type described in U.S. Pat. No. 3,159,435 is unavoidable resonances during rotation of the rotor as part of a balancing operation. Bearing-loaded saddle bearings of the type described in U.K. Pat. No. 2,037,445 must overcome frictional forces at the start of a balancing operation and cannot be used to measure small amounts of unbalance. Saddle bearings are expensive and unreliable on a balancing machine. Balancing machines using measuring tables supported by three or more round springs are limited by the size of the table as to the size of the rotor that can be balanced.

SUMMARY OF THE INVENTION

An advantage of the present invention is the provision of a new support structure for a two-plane balancing machine which enables both balancing of a body or rotor with its own bearings and balancing of a body or rotor without bearings.

Yokes of two support structures in a balancing machine according to the present invention are connected to each other to provide a rigid cradle, without use of flexible bearing or spring-loaded saddles. The yokes in the balancing machine of the present invention also are used as unconnected single support structures, in combination with regular V-blocks or roller bearings, without losing the effect of easy pre-setting of plane separation between the yokes, based on the geometry of the rotor to be balanced.

Work supports for hard bearing machines, similar to those described in U.S. Pat. No. 4,162,633, usually use two or more flat springs to carry the load of the rotor and to guide the unbalance forces almost 100% in a horizontal direction through a load cell, such as a piezo crystal, to ground or the machine bed. Therefore, practically no vibration occurs from unbalance forces. Even overhanging (off-center) roller bearings or V-blocks guide the force (unbalance) almost 100% through the pick ups.

If, instead of flat springs, two round springs are used, the overhanging roller bearings or V-blocks which are not exactly in the pick up plane would make impossible the pre-setting of plane separation based on rotor geometry. When work supports with two or more round springs (instead of flat springs) are connected by rigid cradles, they can accommodate V-blocks and/or fixtures which can hold armatures in their own bearings or armatures with three or more bearings or even armatures with bent shafts.

The present invention provides a balancing machine and a support structure for a two-plane balancing machine with at least one force transducer in each support structure. Two or more round springs carry the yoke and rotor load and direct horizontal unbalance forces through the force transducer load cell. Additionally, flat springs are engaged with the work supports for operation of the supports as work supports for rotors without their own bearings. The flat springs are disengaged when the round springs are used for sole support.

The invention, and its objects and advantages, will become more apparent in the detailed description of a preferred embodiment hereinafter presented.

BRIEF DESCRIPTION OF THE DRAWINGS

In the detailed description of the preferred embodiment of the invention hereinafter presented, reference is made to the accompanying drawings, in which.

DETAILED DESCRIPTION OF THE DRAWINGS

The present description will be directed in particular to elements forming part of, or cooperating more directly, the present invention. Elements not specifically shown or described herein are understood to be selectable from those known in the art.

Figure 1:
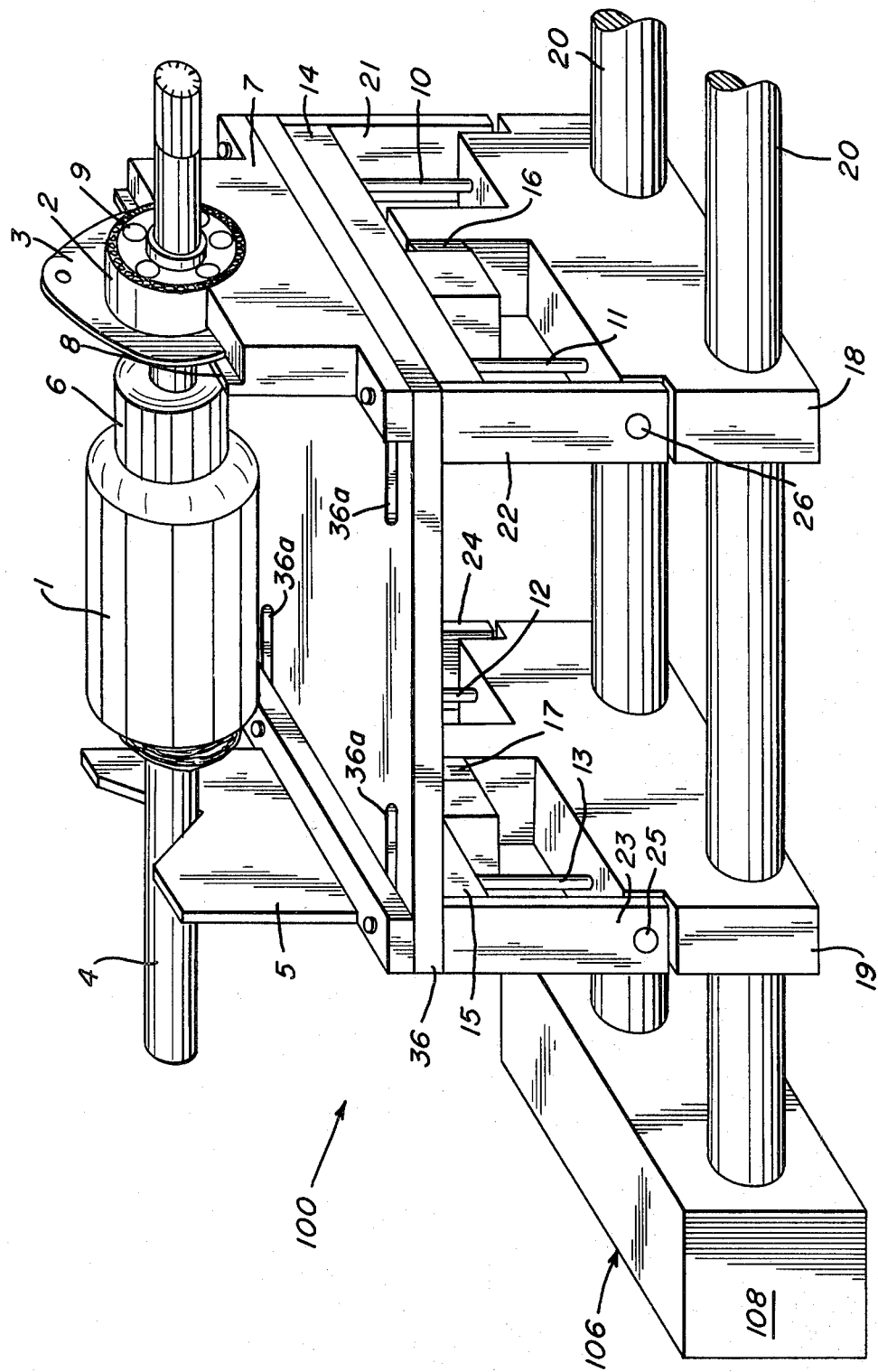
FIG. 1 schematically illustrates an embodiment of a balancing machine according to the present invention having two support structures supporting an armature, the armature having one shaft end supported in a V-bearing and one shaft end carrying a bearing supported in a half shell.
Figure 3:
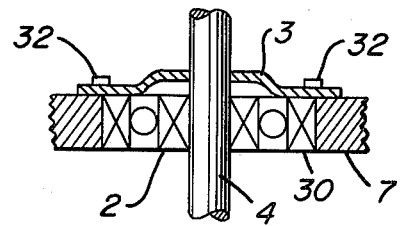
FIG. 3 is a sectional view of the right support of FIG. 1.

Referring now to the drawings, and to FIG. 1 in particular, an armature 1 is illustrated in a position supported by a balancing machine according to the present invention, generally designated 100. The left end of the body or shaft 4 of the armature 1 is loaded or supported in a V-bearing 5, while a bearing 2 pre-assembled on the shaft 4 of the armature 1 is supported in half shell 7. Conventional means (not shown) are provided for rotating the body or rotor at the beginning of a balancing operation. The half shell 7, as best illustrated in FIG. 3, has a bearing 30 supporting the bearing 2 and has fingers 32 formed of spring steel or other suitable material engaged with flange 3. Flange 3 subsequently is used to mount armature 1 and is movable with respect to shaft 4 between the commutator 6 and bearing 2.

Figure 2:
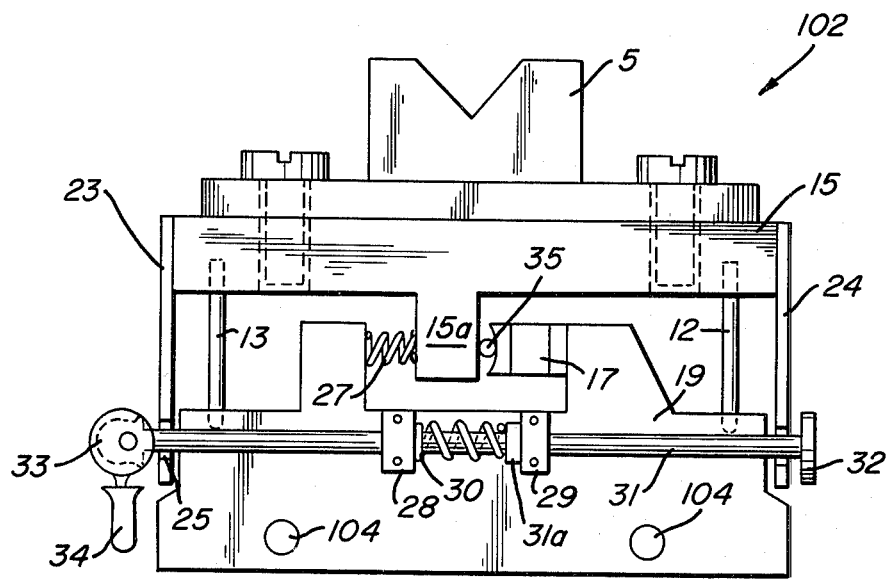
FIG. 2 schematically illustrates a side view of one of the supports of FIG. 1.

Referring now to FIG. 2, one embodiment of a support structure according to the present invention, generally designated 102, is illustrated. The support structure 102 includes a pedestal 19 supporting a yoke 15. The pedestal 19 has spaced apart openings 104 formed therein for guiding movement of the pedestal with respect to guide means, such as parallel rods 20 of a machine bed, generally designated 106, as illustrated in FIG. 1. The rods 20 extend between two machine bases, one of which, designated 108, is illustrated in FIG. 1. It should be readily apparent that other suitable guide means can be used to control movement of the pedestal with respect to the machine bed. Also, conventional means (not shown) are provided for fixing the positions of the support structures with respect to the rods 20. Thus, the distance between the support structures is adjustable in accordance with the dimensions of the rotor to be balanced.

Force measuring means, such as a transducer 17, is connected to an upper portion of the pedestal 19. A spherical ball 35 transmits force from a lower portion 15A of the yoke 15 to the transducer 17. A spring 27 provides an initial biasing force on the lower portion 15A urging it towards transducer 17.

Two different types of support means are provided for interconnecting the yoke 15 with the pedestal 19. First, round springs 12 and 13 extend between confronting portions of a lower surface of the yoke 15 and an upper surface of the pedestal 19. The function of such round springs is to isolate the transducer 17 from certain movements of the yoke 15. Such forces are generated during measurement of unbalance in a rotor having a bearing pre-positioned on a shaft of the rotor that has a vertical axis skewed to the horizontal axis of the rotor. The vertical axis of the bearing can be skewed because the shaft of the axis supporting the bearing is skewed with respect to the axis of the rotor and because the bearing itself is skewed with respect to the axis of the shaft.

The yoke 15 also is selectably connectable to the pedestal 19 by flat springs 23 and 24. Upper portions of the flat springs are rigidly connected to opposed outer edges of the yoke 15, while lower end portions of the flat springs are engageable with side surfaces of the pedestal 19. One embodiment of means for selectably engaging the lower portions of the flat springs with the pedestal includes a rod 31 passing through openings in lower portions of the flat springs. It should be noted that one of the openings, designated 25, is illustrated in FIG. 1. For purposes of convenience, the engaging means has not been illustrated in FIG. 1. A distal end of the rod 31 is provided with an enlarged head 32 that is engagable with the flat spring 24 to move it into contact with a side surface of the pedestal 19. The proximal end of the rod carries a clamp or cam actuating mechanism 33 having a handle 34. Rotation of the handle 34 in a clockwise direction, with respect to the orientation illustrated in FIG. 2, moves the enlarged head to the left so as to clamp flat spring 24 to the pedestal and moves the lower portion of flat spring 23 to the right into engagement with a side surface of the pedestal 19. Thus, rotation of the handle 34 clamps or engages both of the flat springs with the pedestal 19 so that vibration forces in a horizontal plane are transmitted from the yoke to the pedestal. A central portion of the pedestal 19 carries guide blocks 28 and 29 for the rod 31. A collar 31a is rigidly affixed to a portion of the rod between the two supports. A spring 30 acts between the collar 31a and the support 28 to ensure proper positioning of ends of the rod with respect to the pedestal when the handle 34 is oriented as illustrated in FIG. 2. In this manner, separation between the flat springs and the pedestal is ensured.

The yoke 15 is provided with apertures or other suitable means for facilitating connection of appropriate supports, such as a V-bearing 5 or a half shell 7 to an upper surface of the yoke 15. It should be readily apparent that replacement of one type of bearing support with another is a relatively simple operation that can be performed without any effect on the relationship between the pedestal and the yoke.

Referring again to FIG. 1, the yokes 14 and 15 are interconnected by a connecting table 36. The table 36 provides means for selectably interconnecting the yokes with each other for conjoint movement during measurement of unbalance of rotors having bearings mounted on shafts of the rotors. Preferably, the connecting table 36 is provided with elongated slots 36A engagable by suitable fastening devices, such as the bolts connecting the supports to the yokes or other devices not illustrated so that the distance between the yokes can be adjusted. Alternatively, different size tables 36 are provided for each different type of rotor. It should be readily apparent that other suitable interconnection structures, such as threaded rods, can be used to interconnect the yokes for conjoint movement.

As previously discussed, round springs 12 and 13 interconnect yoke 15 with pedestal 19. Similar round springs 10 and 11 interconnect yoke 14 with pedestal 18. Likewise, flat springs 13 and 14 provide selective interconnection between yoke 15 and pedestal 19 and similar flat springs 21 and 22 provide selective interconnection between yoke 14 and pedestal 18. A force transducer 16, which is similar to the previously described force transducer 17, is positioned between the yoke 14 and the pedestal 18. The round springs 10, 11, 12, and 13 hold the table 36 in place while horizontal force generated during the measurement of unbalance of a rotor are guided horizontally through the force transducers.

In a second type of operating mode, the connecting table 36 is moved into a disengaged position, for instance, the table is removed from the support structures 102, and the flat springs are engaged with the pedestals 18 and 19. In this operating mode, the yokes 14 and 15 are movable with respect to each other and are engaged with their respective pedestals so that the balancing machine 100 can be used to balance conventional rotors not having one or more bearings pre-positioned on their shafts.

Previously, a specific embodiment of the present invention has been described. It should be appreciated, however, that such an embodiment has been described for the purposes of illustration only, without any intention of limiting the scope of the present invention. Rather, it is the intention that the present invention be limited only by the appended claims.

What is claimed is:

1. A balancing machine selectively adjustable for measuring unbalance in two different operating modes, the machine in a first operating mode measuring unbalance in a rotor having a bearing prepositioned on a shaft of the rotor and in a second operating mode measuring unbalance in rotor having a shaft, said machine comprising:
   (a) a first support structure;
   (b) a second support structure; each of said support structures comprising:
      (1) a pedestal;
      (2) a yoke;
      (3) force measuring means disposed between said yoke and said pedestal for measuring forces representative of unbalance in a rotor supported by said yoke;
      (4) first resilient means for supporting said yoke on said pedestal so that forces resulting from misalignment of a bearing prepositioned on a shaft of a rotor with respect to an axis of the rotor are automatically compensated for when the machine is used in the first operating mode;
      (5) second resilient means for supporting said yoke on said pedestal, said second resilient means being movable between a first position when the machine is used in the first operating mode and a second position when the machine is used in the second operating mode, said second resilient means in the first position allowing unimpeded movement between said yoke and said pedestal and in the second position resiliently interconnecting said pedestal and said yoke;
      (6) means for releasably holding said second resilient means in the second position thereof; and
      (7) means selectively connectable to said yokes for supporting a shaft of a rotor and for supporting a bearing prepositioned on a shaft of a rotor; and
   (c) means for interconnecting said yokes of said first and said second support structures with each other for joint movement when said machine is adjusted for operation in the first operating mode, said yokes being movable with respect to each other when the machine is adjusted for operation in the second operating mode.

2. A balancing machine for measuring unbalance in a body comprising:
   (a) a machine bed having spaced apart bases interconnected by guide means;
   (b) a pair of pedestals supported by said machine bed, with at least one of said pedestals being supported by said guide means for relative movement with respect to the other pedestal;
   (c) a yoke supported by each of said pedestals;
   (d) sensing means supported by each of said pedestals for sensing movement of the associated yoke resulting from unbalancing forces generated by rotation of a body supported by said yoke;
   (e) means for supporting each of said yokes on its associated pedestal comprising:
      (1) two spaced apart round springs positioned between each of said yokes and its associated pedestal,
      (2) a pair of flat springs associated with each yoke, each flat spring having an upper end rigidly affixed to the yoke and a lower end selectively engageable with the pedestal associated with the yoke so that engagement of the flat spring with the pedestal enables transmission of forces from the yoke to the pedestal whereby horizontal vibration of the yoke is transmitted to the sensing means, and
      (3) means for selectively engaging said flat springs with the associated pedestal; and
   (f) means for selectively interconnecting said yokes with each other for conjoint movement during measurement of unbalance of a body having a bearing positioned on a shaft of the body, said flat springs being disconnected from said pedestals during such measurement, said means for selectively interconnecting being movable into a position allowing independent movement of said yokes with respect to each other when said flat springs are engaged with said pedestals for measuring unbalance.

3. A support structure for use with a balancing machine comprising a pedestal; a yoke; means for interconnecting said pedestal and said yoke; and measuring means disposed between confronting surfaces of said yoke and said pedestal for measuring forces acting on said yoke during measurement of unbalance of a rotating body,
   said yoke comprising means for supporting bearings for a rotating body, and means engageable with interconnection means of the balancing machine for interconnecting said yoke with another yoke;
   said means for interconnecting comprising first resilient means positioned between confronting surfaces of said yoke and said pedestal for supporting said yoke on said pedestal in such manner that forces resulting from misalignment of a bearing prepositioned on a shaft of a rotor with respect to an axis of the rotor are automatically compensated for when said yoke is interconnected with another yoke, second resilient means carried by one of said yoke and said pedestal and selectively engageable with the other of said yoke and said pedestal, and means for selectively engaging said second resilient means with the other of said yoke and said pedestal, said second resilient means when disengaged not interfering with relative movement between said yoke and said pedestal.

4. A support structure for use with a balancing machine comprising a pedestal; a yoke; means for interconnecting said pedestal and said yoke; and means for measuring forces acting on said yoke during measurement of unbalance of a rotating body,
   said pedestal having a portion thereof shaped for guiding horizontal movement of said support structure with respect to a machine bed of a balancing machine and a portion thereof supporting said means for measuring forces;
   said yoke comprising means for supporting bearings for a rotating body, means engageable with interconnection means of the balancing machine for interconnecting said yoke with another yoke, and means positioned in operative relationship with said means for measuring forces for transmitting forces acting on said yoke to said means for measuring forces;
   said means for interconnecting comprising a pair of round springs positioned between confronting surfaces of said yoke and said pedestal, a pair of flat springs carried by one of said yoke and said pedestal and selectively engageable with the other of said yoke and said pedestal, and means for selectively engaging said flat springs with the other of said yoke and said pedestal.

* * * * *